United States Patent

Shimogawa

(10) Patent No.: US 8,719,639 B2
(45) Date of Patent: May 6, 2014

(54) VIRTUAL MACHINE CONTROL PROGRAM, VIRTUAL MACHINE CONTROL SYSTEM, AND DUMP CAPTURING METHOD

(75) Inventor: Kenichirou Shimogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 767 days.

(21) Appl. No.: 12/539,378

(22) Filed: Aug. 11, 2009

(65) Prior Publication Data

US 2010/0162052 A1  Jun. 24, 2010

Related U.S. Application Data

(63) Continuation of application No. PCT/JP2007/055561, filed on Mar. 19, 2007.

(51) Int. Cl.
*G06F 11/00* (2006.01)

(52) U.S. Cl.
USPC .............................. 714/38.11; 714/48; 714/25

(58) Field of Classification Search
USPC ........................................ 714/38.11, 38.1, 48
See application file for complete search history.

(56) References Cited

U.S. PATENT DOCUMENTS

| | | | | |
|---|---|---|---|---|
| 5,437,033 A | * | 7/1995 | Inoue et al. | 714/10 |
| 5,805,790 A | * | 9/1998 | Nota et al. | 714/10 |
| 2002/0029359 A1 | * | 3/2002 | Kiyoi et al. | 714/45 |
| 2003/0145157 A1 | * | 7/2003 | Smullen et al. | 711/104 |
| 2006/0143534 A1 | * | 6/2006 | Dall | 714/38 |
| 2006/0195715 A1 | * | 8/2006 | Herington | 714/4 |

FOREIGN PATENT DOCUMENTS

| | | |
|---|---|---|
| JP | A 64-76237 | 3/1989 |
| JP | A 2-47735 | 2/1990 |
| JP | A 3-257641 | 11/1991 |
| JP | A 4-257036 | 9/1992 |
| JP | A 10-154087 | 6/1998 |
| JP | A 10-333944 | 12/1998 |
| JP | A 2001-290677 | 10/2001 |
| JP | A 2002-32244 | 1/2002 |
| JP | A 2005-122334 | 5/2005 |
| JP | A 2006-172100 | 6/2006 |

\* cited by examiner

*Primary Examiner* — Sarai Butler
(74) *Attorney, Agent, or Firm* — Greer Burns & Crain Ltd.

(57) ABSTRACT

A virtual machine control system includes a dump target setting module that sets a flag that represents that a memory area is a dump target to each memory area that has been used by a guest OS, a dumping module that dumps to a file the memory area to which the dump target setting module sets the flag, and that removes the flag from the memory area about which dumping is completed, and a virtual machine control module that controls implementation of the guest OS, which operates on the virtual machine, and stops the implementation of the guest OS until the dumping module removes the flag from the memory area when the guest OS tries to access the memory area to which the dump target setting module sets the flag.

8 Claims, 6 Drawing Sheets

| VMID | ALLOCATED MEMORY VOLUME | STATUS | DUMP-AWAITED PAGE NUMBER |
|---|---|---|---|
| VM01 | 2 GB | pause | 4 |
| VM02 | 1 GB | run | 0 |
| VM03 | 1 GB | no_use | 0 |
| ... | ... | ... | ... |

| PAGE NUMBER | GUEST ADDRESS | HOST ADDRESS | DUMP FLAG |
|---|---|---|---|
| 1 | 0000 0000 | 3A9C 0000 | off |
| 2 | 0000 0800 | 3A9C 0800 | on |
| 3 | 0000 1000 | 3A9C 1000 | on |
| 4 | 0000 1800 | 3A9C 1800 | on |
| ... | ... | ... | ... |

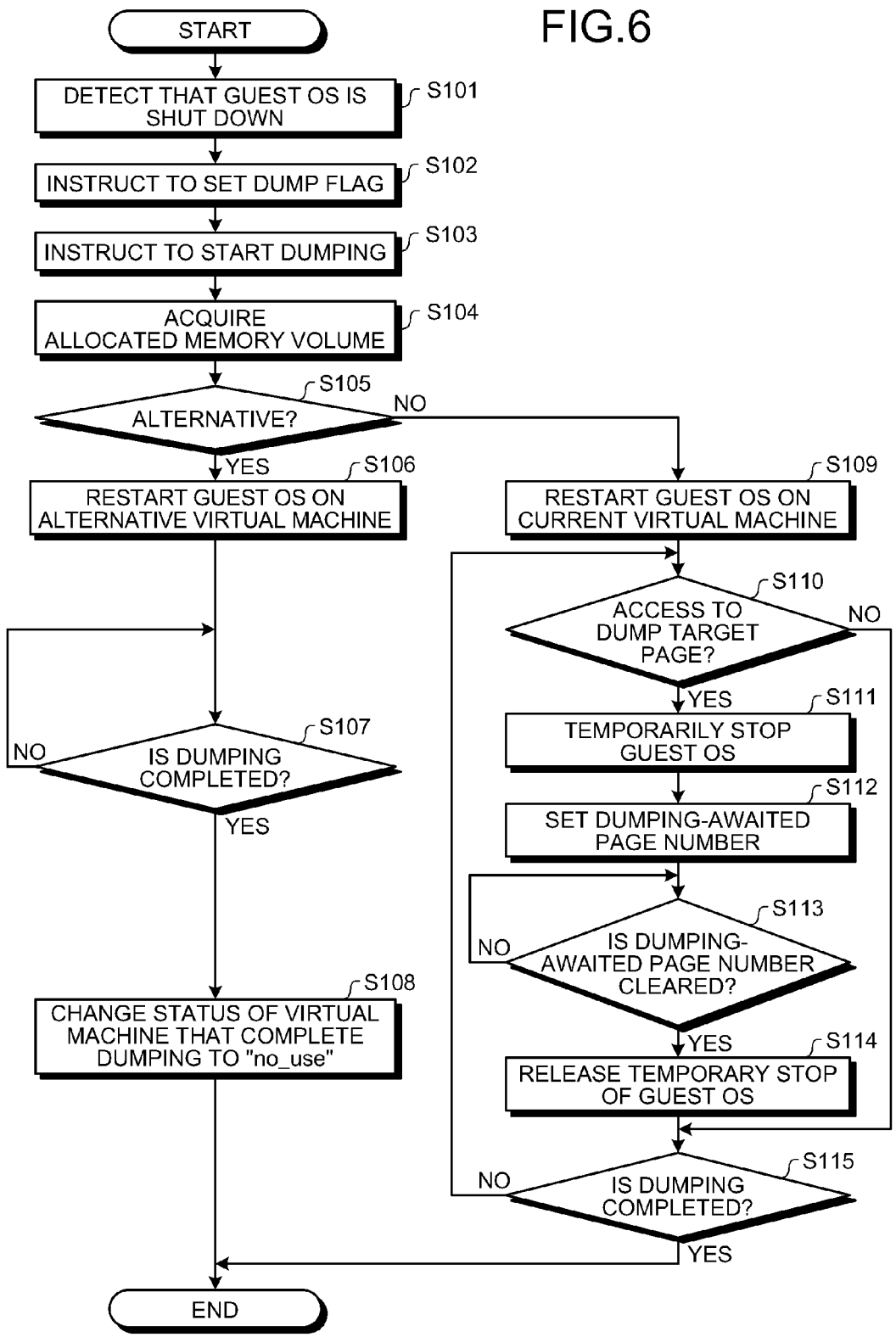

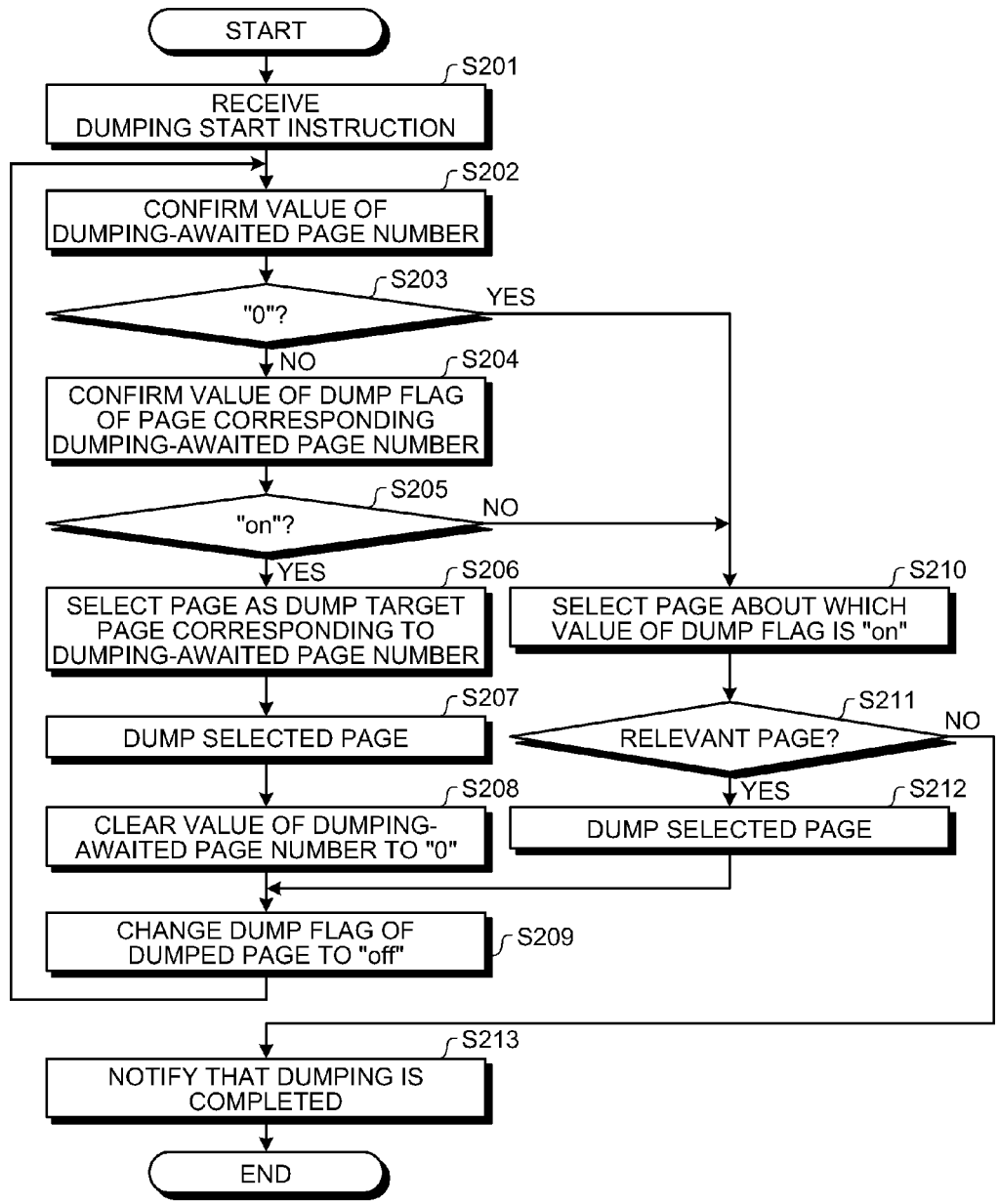

VIRTUAL MACHINE CONTROL PROGRAM, VIRTUAL MACHINE CONTROL SYSTEM, AND DUMP CAPTURING METHOD

CROSS-REFERENCE TO RELATED APPLICATION

This application is a continuation of PCT international application Ser. No. PCT/JP2007/055561 filed on Mar. 19, 2007 which designates the United States, the entire contents of which are incorporated herein by reference.

FIELD

The embodiments discussed herein are directed to a virtual machine control program, a virtual machine control system and a dump capturing method.

BACKGROUND

Virtual machine technologies are known in which a virtual machine is implemented by software on a computer such that an OS is implemented and an application is executed on the virtual machine. If the OS is shut down when the OS and the application are being caused to operate on the virtual machine, it is necessary to dump and store the contents of a memory that is used by the OS in order to investigate the cause of the failure.

In a conventional technology, to retain information, an OS may not be restarted while a dump is being captured. Therefore, operations that are stopped because the OS is shut down may not be restarted until capturing a dump is completed, which leads to a delay in restarting the operations. The problem has become greater recently because the volume of memory that an OS uses has increased and thus the time required to capture a dump tends to be longer.

Japanese Laid-open Patent Publication No. 10-333944 discloses a technology to solve the problem in which, by modifying an OS, a kernel of the OS is dumped and the OS is restarted beforehand and thus operations are restarted in parallel with capturing a dump of other parts. Further, Japanese Laid-open Patent Publication No. 2001-290677 discloses a technology in which a memory of a virtual machine in which a failure occurs is transferred to a standby virtual machine and the standby virtual machine is caused to dump the contents of the memory, which restarts operations more promptly.

In the technology disclosed in Japanese Laid-open Patent Publication No. H10-333944, it is assumed that the OS that is caused to operate on the virtual machine is deformed. Therefore, the technology may not be applied to cases where a commercially available compiled OS is caused to operate on a virtual machine. In the technology disclosed in Japanese Laid-open Patent Publication No. 2001-290677, memory transfer between virtual machines is necessary, which leads to a delay in restarting operations.

SUMMARY

According to an aspect of an embodiment of the invention, a virtual machine control system that causes a guest OS to operate on a virtual machine and dumps each memory area that has been used by the guest OS when a failure occurs in the guest OS, includes a dump target setting module that sets a flag that represents that the memory area is a dump target to each memory area that has been used by the guest OS; a dumping module that dumps to a file the memory area to which the dump target setting module sets the flag, and that removes the flag from the memory area about which dumping is completed; and a virtual machine control module that controls implementation of the guest OS, which operates on the virtual machine, and stops the implementation of the guest OS until the dumping module removes the flag from the memory area when the guest OS tries to access the memory area to which the dump target setting module sets the flag.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an example of an address conversion table in the case where the virtual machine control program is executed;

FIG. 6 is a flowchart of operations of a virtual machine control unit; and

FIG. 7 is a flowchart of operations of a dumping unit.

DESCRIPTION OF EMBODIMENTS

Exemplary embodiments of a virtual machine control program, a virtual machine control system and a dump capturing method according to the present invention are described below in greater detail with reference to the accompanying drawings. The present invention is not limited to the embodiments.

Figure 1:
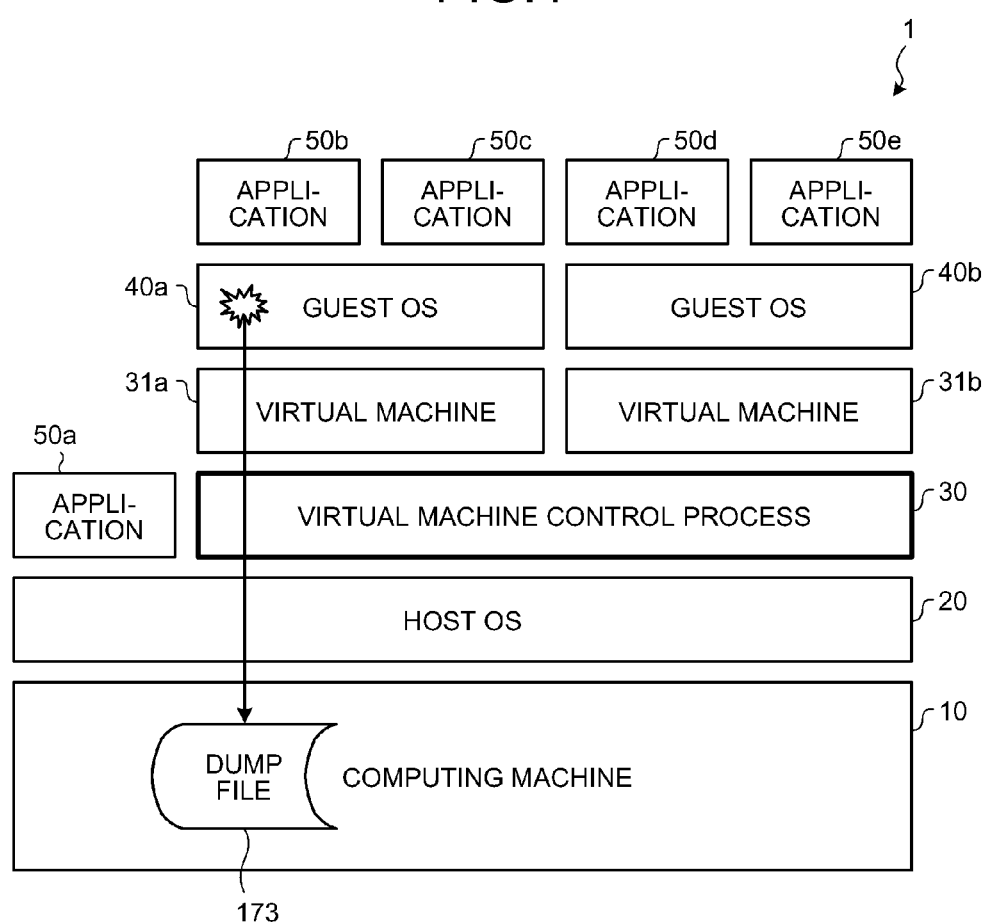
FIG. 1 is a diagram for explaining a virtual machine control system according to an embodiment.

A virtual machine control system according to an embodiment is explained below. FIG. 1 is a diagram for explaining a virtual machine control system 1. A computing machine (or computer) 10 is a physical computing machine that includes a CPU (central processing unit) that performs various computing processes and a RAM (random access memory) that temporarily stores therein various types of information.

A host OS 20 is basic software that provides various services to various applications such as an application 50a that operates on the computing machine 10. The host OS 20 is usually simply referred to as OS. In the specification, an OS that operates on a physical computing machine is referred to as a host OS and an OS that operates on a virtual machine is referred to as a guest OS in order to distinguish between them.

A virtual machine control process 30 is a process that is achieved when a virtual machine control program according to the embodiment is executed. The virtual machine control process 30 implements a virtual machine 31a and a virtual machine 31b on which a guest OS 40a and a guest OS 40b are caused to operate. The guest OS 40a and the guest OS 40b are basic software that can operate as a host OS if they are introduced into the computing machine 10. The guest OS 40a provides various services to an application 50b and an application 50c. The guest OS 40b provides various services to an application 50d and an application 50e. The host OS 20, the guest OS 40a, and the guest OS 40b may be the same type or different types.

The virtual machine control process 30 is also referred to as Hypervisor. For example, the virtual machine control process 30 performs control to, for example, replace an access of a virtual machine to a resource is replaced by an access of a physical computing machine to a resource or adjust processes of virtual machines that compete with each other. When the guest OS 40a or the guest OS 40b is shut down due to a failure, the virtual machine control process 30 stores as a dump file 173 the contents of a memory that has been used by the shut-down guest OS in, for example, a hard disk device of the computing machine 10 in order to investigate the cause of the failure.

If a guest OS is shut down, it is necessary to restart the guest OS and an application that operates on the guest OS as promptly as possible in order to restore services that have been provided by the application. However, the memory to be dumped may not be overwritten by restarting the OS before the dumping is completed.

The conflicting problem is solved as follows. If there is an unused memory area sufficient to implement a new virtual machine when a guest OS is shut down, the virtual machine control process 30 implements a new virtual machine, using the unused memory area, and restarts the guest OS on the new virtual machine. In parallel with these operations, the virtual machine control process 30 causes the virtual machine on which the guest OS is shut down to perform dumping.

In this case, restarting the OS is started remarkably promptly without transfer of the memory contents between the virtual machines. In addition, restarting the guest OS and the dumping process do not compete with each other. Thus, the guest OS and provision of services may be restarted in a remarkably short period.

If there is not a sufficient unused memory area to implement a new virtual machine when a guest OS is shut down, the virtual machine control process 30 sets a flag representing that a page is being dumped to each page of the memory that has been used by the guest OS. Thereafter, the virtual machine control process 30 restarts the guest OS and performs dumping on the virtual machine in parallel.

When the guest OS that has been restarted tries to access a page about which dumping is not completed, the virtual machine control process 30 temporarily stops implementing the guest OS until dumping the page is completed, which solves the problem that restarting the guest OS and the dumping process compete with each other.

The time necessary for implementing a guest OS again and executing an application again is usually shorter than the time necessary for dumping. Because the guest OS is restarted and the dumping process is performed in parallel, restarting the guest OS is completed before the dumping process is completed even though implementing the guest OS is temporarily stopped. Therefore, provision of services may be restarted in a short time compared with a case where the guest OS is restarted after the dumping process is completed.

Figure 2:
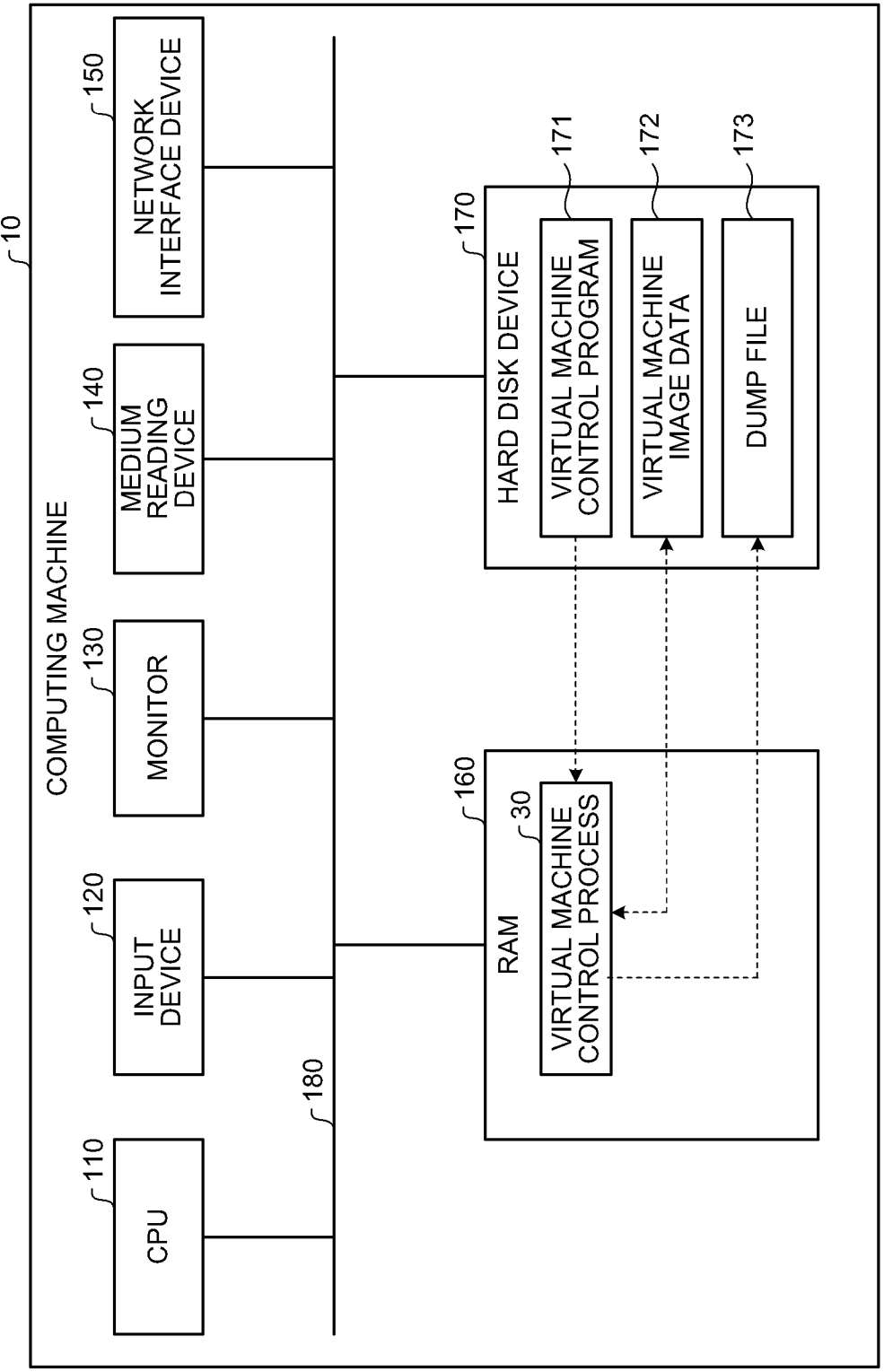
FIG. 2 is a block diagram of a configuration of a computing machine illustrated in FIG. 1.

How the virtual machine control process 30 starts is explained below. FIG. 2 is a block diagram of a configuration of the computing machine 10 illustrated in FIG. 1. As illustrated in FIG. 2, the computing machine 10 includes a CPU 110 that performs various computing processes; an input device 120 that receives data input by a user; a monitor 130 that displays various types of information; a medium reading device 140 that reads a program from a recording medium; a network interface device 150 that communicates data with other computers via a network; a RAM 160 that temporarily stores therein various types of information; a hard disk device 170, all of which are connected to one another via a bus 180.

The hard disk device 170 stores therein a virtual machine control program 171. The CPU 110 reads the virtual machine control program 171 from the hard disk device 170 and loads the virtual machine control program 171 on the RAM 160, so that the virtual machine control program 171 functions as the virtual machine control process 30.

By reading virtual machine image data 172 that is stored in the hard disk device 170 and loading the virtual machine image data 172 on a virtual memory area that is allocated to the virtual machine control process 30, the virtual machine control process 30 implements a virtual machine and causes a guest OS that is contained in the virtual machine image data 172 to start on the virtual machine. The guest OS that has been started starts an application that is contained in the virtual machine image data 172 to start providing services.

The virtual machine control process 30 performs various types of control necessary for causing the guest OS and the application that is started by the guest OS to operate on the virtual machine. If the guest OS is shut down due to a failure, the virtual machine control process 30 stores as the dump file 173 the contents of a memory that has been used by the guest OS in the hard disk device 170.

Figures 3, 4:
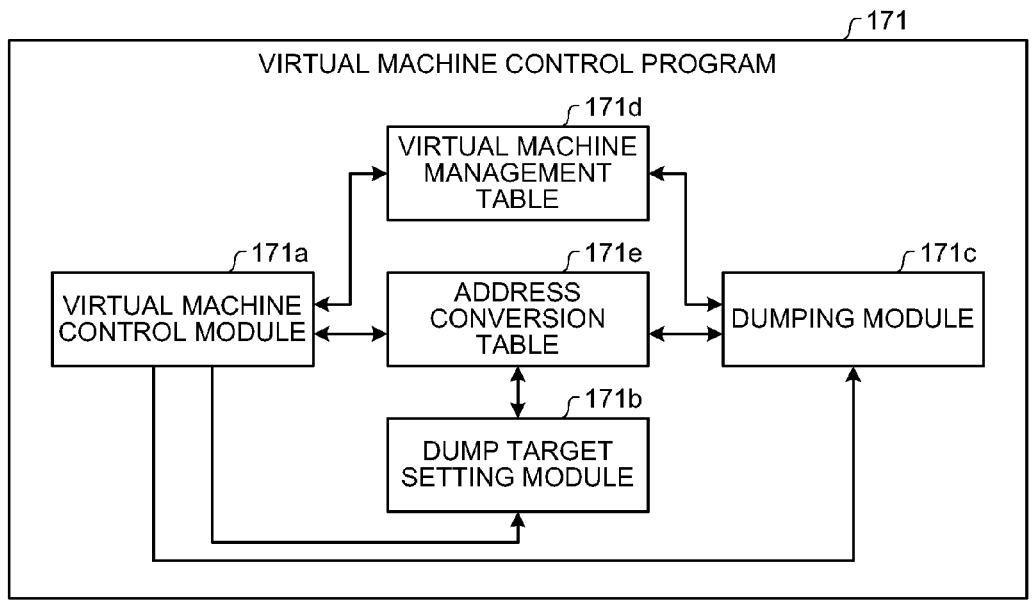
FIG. 3 is a diagram of a configuration of a virtual machine control program.
FIG. 4 is an example of a virtual machine management table in the case where the virtual machine control program is executed.

A configuration of the virtual machine control program 171 illustrated in FIG. 2 is explained below. FIG. 3 is a diagram of a configuration of the virtual machine control program 171. As illustrated in FIG. 3, the virtual machine control program 171 includes a virtual machine control module 171a, a dump target setting module 171b, a dumping module 171c, a virtual machine management table, and an address conversion table 171e.

The virtual machine control module 171a is a control module that performs various types of control necessary for causing the guest OS and applications to operate on the virtual machine. When the virtual machine control module 171a detects that the guest OS that operates on the virtual machine is shut down, the virtual machine control module 171a instructs the dump target setting module 171b to set as a dump target each page of a memory that has been used by the guest OS, and instructs the dumping module 171c to dump the page that is set as a dump target by the dump target setting module 171b.

Thereafter, the virtual machine control module 171a restarts the guest OS that has been shut down. Specifically, as explained above, if there is a sufficient free memory area, the virtual machine control module 171a starts a guest OS, using the free memory area. If there is not a sufficient free memory area, the virtual machine control module 171a restarts the guest OS on the virtual machine on which the guest OS is shut down. If there is a memory access to a page about which dumping is not completed, the operations of the guest OS are temporarily stopped until dumping the page is completed.

The dump target setting module 171b is a processing module that sets "on" a dump flag of an entry of the address conversion table 171e that corresponds to each page of the memory that has been used by the guest OS that has been shut down.

The dumping module 171c is a processing module that sequentially writes to the dump file 173 a page corresponding to an entry about which a dump flag is set "on" by the dump target setting module 171b. When the guest OS is temporarily stopped until dumping is completed, the dumping module 171c dumps first a page about which dumping is awaited by the guest OS as a priority, which restarts the guest OS more promptly.

A virtual machine management table 171d is a table that retains information about virtual machines. FIG. 4 is an example of the virtual machine management table 171d in the case where the virtual machine control program 171 is executed. As illustrated in FIG. 4, the virtual machine management table 171*d* includes items: VMID, ALLOCATED MEMORY VOLUME, STATUS, and DUMPING-AWAITED PAGE NUMBER.

VMID represents an identification number for identifying a virtual machine. MEMORY ALLOCATION VOLUME represents the volume of memory allocated to the virtual machine. STATUS represents the status of the virtual machine that is represented by any one value of "run", "pause", and "no_use". "run" represents that the virtual machine is in operation. "pause" represents that the virtual machine is temporarily stopped until dumping is completed. "no_use" represents that the virtual machine is not used. DUMPING-AWAITED PAGE NUMBER represents a page number about which dumping is awaited by the virtual machine.

The address conversion table 171*e* is a table for converting on a page basis addresses that are used for memory access in the virtual machine to addresses that are used for memory access by an application that operates on the host OS. FIG. 5 is an example of the address conversion table 171*e* in the case where the virtual machine control program 171 is executed. As illustrated in FIG. 5, the address conversion table 171*e* has items: PAGE NUMBER, GUEST ADDRESS, HOST ADDRESS, and DUMP FLAG. There are tables for respective virtual machines.

PAGE NUMBER represents a page number for identifying a page. GUEST OS represents an address of the page in a memory space of the virtual machine. HOST ADDRESS is an address of the page in a virtual memory space of the host OS. DUMP FLAG is a flag with which a page to be dumped is set "on" by the dump target setting module 171*b*.

Operations of the virtual machine control program 171 illustrated in FIG. 3 are explained below. FIG. 6 is a flowchart of operations of the virtual machine control module 171*a*. The flowchart of FIG. 6 represents operations from when the virtual machine control module 171*a* detects that the guest OS is shut down to when the virtual machine control module 171*a* completes dumping. Operations necessary for controlling virtual machines other than the virtual machine on which the guest OS has been shut down are omitted from FIG. 6.

As illustrated in FIG. 6, when the virtual machine control module 171*a* detects that a guest OS is shut down (step S101), the virtual machine control module 171*a* instructs the dump target setting module 171*b* to set "on" a dump flag of an entry of the address conversion table 171*e* that corresponds to each page of a memory that has been used by the guest OS (step S102) and instructs the dumping module 171*c* to start dumping the page that is set as a dump target by the dump target setting module 171*b* (step S103).

The virtual machine control module 171*a* refers to the virtual machine management table 171*d* and acquires the volume of memory that is allocated to the virtual machine on which the guest OS has been shut down (step S104). If a virtual machine that can be an alternative of the guest OS, i.e., a virtual machine to which a volume of memory same as or larger than the volume allocated to the virtual machine is allocated and whose status is "no_use" is in the virtual machine management table 171*d* (YES at step S105), the virtual machine control module 171*a* restarts the guest OS on the virtual machine and changes the status of the virtual machine to "run" (step S106).

The virtual machine control module 171*a* waits until the dumping module 171*c* completes dumping (NO at step S107). When the dumping is complete (YES at step S107), the virtual machine control module 171*a* changes the status of the virtual machine that completes dumping to "no_use" (step S108).

When no alternative virtual machine is in the virtual machine management table 171*d* (NO at step S105), the virtual machine control module 171*a* restarts the guest OS on the current virtual machine (step S109). If the value of a dump flag of a relevant page is "on", i.e., if the page is a dump target but capturing a dump is not completed yet, when the virtual machine control module 171*a* refers to the address conversion table 171*e* to process a memory access request from the guest OS (YES at step S110), the virtual machine control module 171*a* changes the status of the guest OS to "pause" and temporarily stops the guest OS (step S111) and sets the page number of the page to which access request is made as a dumping-awaited page number (step S112).

The virtual machine control module 171*a* waits for the dump waiting page number to be cleared to "0" (NO at step S113). When the dumping-awaited page number is cleared (YES at step S113), the virtual machine control module 171*a* changes the status of the guest OS to "run" and releases the temporary stop (step S114). The virtual machine control module 171*a* continues monitoring memory accesses until the dumping module 171*c* completes capturing the dump (step S115).

FIG. 7 is a flowchart of operations of the dumping module 171*c*. As illustrated in FIG. 7, the dumping module 171*c* receives an instruction for starting dumping (step S201), the dumping module 171*c* refers to the virtual machine management table 171*d* and confirms the value of the dumping-awaited page number of the virtual machine that is a dump target (step S202).

When the value of the dumping-awaited page number is not "0" (NO at step S203), the dumping module 171*c* refers to the address conversion table 171*e* and confirms the value of the dump flag of the page corresponding to the dumping-awaited page number (step S204). If the value of the dump flag is "on" (YES at step S205), the dumping module 171*c* selects the page corresponding to the dumping-awaited page number as a dump target (step S206).

Thereafter, the dumping module 171*c* dumps the selected page (step S207) and clears the dumping-awaited page number to "0" (step S208). The dumping module 171*c* changes the dump flag of the dumped page to "off" (step S209) and then restarts the process from step S202.

In contrast, when the value of the dumping-awaited page number is "0" (YES at step S203) or when the value of the dump flag of the page corresponding to the dumping-awaited page number is not "on" (NO at step S205), the dumping module 171*c* refers to the address conversion table 171*e* and selects as a dump target a page about which a dump flag has a value "on" (step S210).

When there is a relevant page (YES at step S211), the dumping module 171*c* dumps the selected page (step S212) and changes the dump flag of the dumped page to "off" (step S209). Thereafter, the dumping module 171*c* restarts the process from step S202. When there is no relevant page (NO at step S211), the dumping module 171*c* notifies the virtual machine control module 171*a* that dumping is completed (step S213) and completes the process.

As described above, in the embodiment, a flag that represents a memory area is a dump target is set in each memory area that has been used by a guest OS that has been shut down. The flag is removed after dumping the memory area is completed. If the guest OS tries to access the memory area from which the flag is not removed, the guest OS is stopped until the flag is removed. This makes it possible to capture or perform a dump and restart the guest OS in parallel. Accordingly, it is possible to dump the memory that has been used by the guest OS that has been shut down while promptly restarting the guest OS, which is caused to operate on a virtual machine, without modifying the guest OS.

If there is sufficient volume of an unused memory area, the memory area is used to achieve a different new virtual machine and the guest OS is restarted on the new virtual machine. Therefore, the OS can be restarted remarkably promptly.

In the above embodiments, how much dumping progresses is managed on a page basis. Alternatively, how much dumping progresses may be managed on a different basis. In the above embodiments, a flag that represents how much dumping progresses is provided to the table for address conversion. Alternatively, such a flag may be provided to a different table.

According to the embodiments, a flag that represents a memory area is a dump target is set in each memory area that has been used by a guest OS that has been shut down. The flag is removed after dumping the memory area is completed. If the guest OS tries to access the memory area from which the flag is not removed, the guest OS is stopped until the flag is removed. This makes it possible to capture or perform a dump and restart the guest OS in parallel. Accordingly, it is possible to dump the memory that has been used by the guest OS that has been shut down while promptly restarting the guest OS, which is caused to operate on a virtual machine, without modifying the guest OS.

According to the embodiments, because restarting the guest OS is started before the dumping is completed, the guest OS may be restarted promptly.

According to the embodiments, because a memory area to which the shut-down guest OS tries to access is dumped as a priority, the time during which the guest OS waits until the dumping is completed is short. This makes it possible to restart the OS promptly.

According to the embodiments, when there is sufficient volume of unused memory, a different virtual machine is implemented using the memory and the guest OS is restarted on the virtual machine. This makes it possible to restart the OS remarkably promptly.

The elements of the present invention or arbitrary combinations of expressions and elements that are applied to a method, an apparatus, a system, a computer program, a recording medium, and a data structure can be embodiments of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable recording medium that stores therein a computer program causing a computer to implement a virtual machine on which a guest OS operates, the computer program, through the virtual machine, causing the computer to execute:

setting a flag, when a failure occurs in the guest OS, to a memory area that has been used by the guest OS, the flag indicating that the memory area is a dump target;

dumping to a file the memory area to which the flag is set, and removing the flag from the memory area about which dumping is completed;

restarting the guest OS in parallel with the dumping; and stopping, when the restarted guest OS requests to access the memory area to which the flag is set, the guest OS from accessing the memory area until the flag is removed from the memory area, wherein the restarting includes, when there is a free memory sufficient to implement a virtual machine different from the virtual machine on which the guest OS in which the failure occurred has operated, restarting the guest OS on a virtual machine that is implemented using the free memory.

2. The non-transitory computer-readable recording medium according to claim 1, wherein the restarting includes, when a failure occurs in the guest OS that is operating on the virtual machine, restarting the guest OS on the virtual machine after the flag is set and before dumping is completed.

3. The non-transitory computer-readable recording medium according to claim 1, wherein the dumping includes dumping as a priority the memory area which the guest OS is stopped from accessing.

4. A virtual machine control system that implements a virtual machine on which a guest OS operates, the virtual machine control system including a processor, the processor executing, through the virtual machine, a process comprising:

setting a flag, when a failure occurs in the guest OS, to a memory area that has been used by the guest OS, the flag indicating that the memory area is a dump target;

dumping to a file the memory area to which the flag is set, and removing the flag from the memory area about which dumping is completed;

restarting the guest OS in parallel with the dumping; and stopping, when the restarted guest OS requests to access the memory area to which the flag is set, the guest OS from accessing the memory area until the flag is removed from the memory area, wherein the restarting includes, when there is a free memory sufficient to implement a virtual machine different from the virtual machine on which the guest OS in which the failure occurred has operated, restarting the guest OS on a virtual machine that is implemented using the free memory.

5. The virtual machine control system according to claim 4, wherein the restarting includes, when a failure occurs in the guest OS that is operating on the virtual machine, restarting the guest OS on the virtual machine after the flag is set and before dumping is completed.

6. The virtual machine control system according to claim 4, wherein the dumping includes dumping as a priority the memory area which the guest OS is stopped from accessing.

7. A dump capturing method that implements a virtual machine on which a guest OS operates, the dump capturing method, through the virtual machine, comprising:

setting a flag, when a failure occurs in the guest OS, to a memory area that has been used by the guest OS, the flag indicating that the memory area is a dump target;

dumping to a file the memory area to which the flag is set, and removing the flag from the memory area about which dumping is completed; and restarting the guest OS; and stopping, when the restarted guest OS requests to access the memory area to which the flag is set, the guest OS from accessing the memory area, until the flag is removed from the memory area, wherein the dumping, the restarting and the stopping are executed in parallel, wherein the restarting includes, when there is a free memory sufficient to implement a virtual machine different from the virtual machine on which the guest OS in which the failure occurred has operated, restarting the guest OS on a virtual machine that is implemented using the free memory.

8. The dump capturing method according to claim 7, wherein the dumping includes dumping as a priority the memory area which the guest OS is stopped from accessing.

* * * * *